United States Patent [19]

Dede et al.

[11] Patent Number: 4,610,814

[45] Date of Patent: Sep. 9, 1986

[54] PROCESS FOR THE PREPARATION OF PROTEIN CONCENTRATES AND NUTRIMENTS BY PROCESSING ANIMAL BLOOD

[75] Inventors: Laszlo Dede; Maria Dede nee Pal, both of Budapest; Terez Varga nee Varga, Kiskunhalas; Peter Barati, Kunfeherto; Imre Szarvas, Kiskunhalas; Beno Fodor; Imre Szecsenyi, both of Kunfeherto; Jozsef Pap Szekeres, Kiskunhalas; Kalman Serester, Budapest, all of Hungary

[73] Assignee: Kiskunhalasi Allami Gazdasag, Kiskunhalas, Hungary

[21] Appl. No.: 616,944

[22] Filed: Jun. 4, 1984

[30] Foreign Application Priority Data

Jun. 3, 1983 [HU]  Hungary ............................. 1992/83

[51] Int. Cl.$^4$ ................................................ A23J 1/06
[52] U.S. Cl. .................................... 530/380; 424/101; 426/647; 426/657; 530/385
[58] Field of Search ............................ 260/112 B, 122; 424/101; 426/647, 657

[56] References Cited

U.S. PATENT DOCUMENTS

| | | | |
|---|---|---|---|
| 1,403,892 | 1/1922 | Butterfield | 260/112 B |
| 2,391,387 | 12/1945 | Bradshaw et al. | 260/112 B |
| 2,705,230 | 3/1955 | Reid | 260/122 |
| 2,761,809 | 9/1956 | Kupferberg et al. | 260/112 B |
| 2,761,811 | 9/1956 | Kupferberg et al. | 260/112 B |
| 2,765,299 | 12/1956 | Porsche et al. | 260/122 |
| 2,874,134 | 2/1959 | Gossett et al. | 260/112 B |
| 3,080,244 | 3/1963 | Cone et al. | 260/112 B |
| 3,672,954 | 6/1972 | Grippa | 260/112 B |
| 3,813,289 | 5/1974 | Huber et al. | 260/112 B |
| 4,075,197 | 2/1978 | Schuck et al. | 260/112 B |
| 4,096,244 | 6/1978 | Newson et al. | 424/101 X |
| 4,097,473 | 6/1978 | Lewis, Jr. et al. | 260/122 |
| 4,156,681 | 5/1979 | Schneider et al. | 260/122 |
| 4,180,592 | 12/1979 | Buckley et al. | 426/647 X |
| 4,290,774 | 9/1981 | Girgis et al. | 260/112 B |
| 4,297,344 | 10/1981 | Schwinn et al. | 260/112 B |
| 4,347,259 | 8/1982 | Suzuki et al. | 260/112 B |
| 4,411,915 | 10/1983 | Eriksson | 260/112 B |

FOREIGN PATENT DOCUMENTS

| | | | |
|---|---|---|---|
| 0139844 | 5/1985 | European Pat. Off. | 426/647 |
| 0140110 | 5/1985 | European Pat. Off. | 426/647 |
| 2142031 | 1/1985 | United Kingdom | 426/647 |

OTHER PUBLICATIONS

Kirk-Othmer, Encyclopedia of Chemical Technology, vol. 3, 1964, pp. 567-573.

*Primary Examiner*— Schain
*Attorney, Agent, or Firm*—Karl F. Ross; Herbert Dubno

[57] ABSTRACT

The invention relates to a process for the preparation of protein concentrates and nutriments by processing animal blood.

According to the invention to the animal blood or to the fractions thereof separated by centrifuging additives are added, the mixture is submitted to heat treatment, then the precipitated proteins are optionally separated and dried.

10 Claims, No Drawings

PROCESS FOR THE PREPARATION OF PROTEIN CONCENTRATES AND NUTRIMENTS BY PROCESSING ANIMAL BLOOD

The invention relates to a process for the preparation of protein concentrates and nutriments by processing animal blood.

The blood arising in big quantities from slaughter-houses is utilized first of all for the preparation of blood powder suitable for animal feeding. A substance suitable for human consumption is prepared from blood, too, taken under sterile conditions by evaporating the water content of the blood. Other processes concentrate the proteins of the blood by treating it with organic solvents and then eliminating the organic solvent from the protein. The energy demand of the mentioned processes is rather high and e.g. for the blood powder used for feeding before use the water has again to be returned so that it will be suitable for consumption. Particularly the obtaining of the plasma proteins demands much energy because its protein content is only 7 to 7.5%. The high energy costs do not justify economically the processing of such thin protein solutions. In the case of the most widely used spraying-drying methods the blood enters a space of a temperature of 300°–400° C. wherein owing to the high temperature the valuable sulfur-containing amino acids indispensably necessary for the function and regeneration of the liver are damaged. Thus in adddition to the high energy investment the obtained product becomes biologically less valuable. The object of the invention is to eliminate the mentioned disadvantages by eliminating a considerable part of the water from blood or its elements by an energy-saving method and forming a substance enriched in protein as a solid product, blood and, respectively, plasma precipitate which itself, wet or further dried, freshly or stored can be used as a nutriment or for the preparation of nutriments or fodders. The advantage of the present process is that it can be performed in the presence of additives like the trace elements necessary for the organism, such as iron, manganese, copper, cobalt, zinc and so on which are attached to the proteins in the course of the process, thus a protein concentrate, that is blood precipitate capable of absorbing and enriched in trace elements can be prepared. This special nutriment inhibits the establishing of diseases originating from the lack of iron or other trace elements and, respectively, is suitable for the medical treatment of such diseases. The preparation of the blood or plasma precipitate can be carried out in the presence of other biologically useful substances, too, such as substances of plant origin, in this case the fodder additives can be controlled and their optimum addition, too, is assured. The present process renders possible the preparation of such special fodders, too, which include urea or pharmaceutical products in a homogeneous distribution which is nearly impossible in the case of bigger livestock in the fodder forms used nowadays.

The essence of the invention resides in the fact that additives are added to the animal blood or the fractions thereof separated by centrifugation, the mixture is substituted submitted to heat-treatment at a temperature between 70° and 140° C., then the precipitated proteins are optionally separated and dried.

As additive e.g. sodium chloride, sodium-hydrogen-carbonate, sodium-carbonate, iron(II)-salts and the salts of other trace elements, amino acids, organic acids or the alkali metal salts thereof, various pharmaceutical products, e.g. antibiotics, vitamins, various animal substances, e.g. waste products of slaughter-houses, different plant substances, such as vegetables, fruits, cereal milling products, furthermore activated carbon, and as B-vitamin source yeast-milk and other flavoring agents can be taken into consideration.

According to an advantageous method of the invention the blood, the average protein content of which is 20 to 22%, is separated to plasma and to the fraction containing the blood constituents, first of all hemoglobin. In the solution of the constituents the protein content is enriched to 30-32%. Then the blood fraction separated from the plasma is admixed with the additives and heated to 80° C. for 5 minutes and the complete mass is formed to a solid precipitate. The substance rich in protein contains additives dissolved before the solidification in a stabilized homogeneous distribution. Though the product is already in a germ-poor state, it is further pasteurized or sterilized. The sterilization is suitably performed in the hermetically-sealed packing wherein the product is to be stored. Thus a nutriment, protein concentrate of a high biological value, prepared with an energy saving method, storable asepticly for a long time and containing the desired additives in a stabilized homogeneous distribution is obtained.

The plasma separated from the blood constituents and containing 7 to 7.5% of protein is heated to 80° C. for five minutes, too. If a hydrophilic plasma protein concentrate is to be prepared, 1 to 4% of sodium-hydrogen-carbonate, amino acids or organic acids or the alkali salt thereof are added to the plasma liquid before heating. By the heat-treatment the plasma liquid is separated to a solid and a liquid phase. After the separation of the two phases the liquid is spilled off. In the obtained solid plasma precipitate the protein content is enriched to 15-18% which can be used alone or with additives as nutriment. The plasma precipitate can be further processed by pressing to a substance further enriched in protein or e.g. by drying at a temperature below 80° C. to a hydrophilous plasma powder which can be used for the protein enriching of nutriments and meat products.

To the blood or to the fractions thereof iron(II)-salts or other trace element salts necessary for the organism can be added. The proteins bind the metal ions. The proteins containing the metals can be precipitated, e.g. by ethyl alcohol, and separated from the solvent or the protein solution including the metals can be converted into plasma or blood precipitate, by heating. The product can be used as a nutriment of particularly advantageous properties.

If the plasma proteins are not to be separated from the constitutent elements of the blood, the formation of blood precipitate can be carried out with the complete blood, too. In this case the advantageous consistence of the product and the homogeneous distribution of the additives can be assured by adding e.g. 5-10% of a cereal milling product, bran or starch to the blood after the additon of additives but before the heat-treatment. The use of such additives is suitable, too, if owing to the slaughter technique the blood is watered.

An advantage of the present process is that the preparation of storable fodder mixtures enriched with blood precipitate is assured in one working process by utilizing plant and/or animal waste products which are today environment impurifying factors because their processing to a storable fodder themselves is not economical.

Such products are slaughter-house waste products or e.g. the molasses.

The process according to the invention is demonstrated with the help of the following examples.

EXAMPLE 1

200 liters of ox blood taken under sterile conditions is separated to plasma and to the fraction containing constituent elements by centrifuging. 110 l of blood plasma and 90 l of a fraction containing mainly haemoglobin are obtained. To the blood plasma 2.5 kg of sodium hydrogen carbonate are added and the mixture is heated to 80° C. after the dissolving of the salt under slow admixing for 5 minutes. The precipitated plasma proteins are separated from the liquid phase by centrifuging, dried in vacuo at a temperature of 40° C. and pulverized, 7.5 kg of a hydrophilous plasma powder are obtained which is suitable for the preparation of food of a high biological value. To the 90 l of the thick part a solution of 5 kg of ferrosulfate prepared with 10 l of water is added, the mixture is thoroughly admixed and heated in an air-tight vessel for five minutes to 80, then for sixty minutes to 100° C. The obtained product is a blood precipitate containing the iron in a stabilized homogeneous distribution which is a nutriment satisfying a special demand for organisms lacking iron.

EXAMPLE 2

To 100 l of a blood fraction separated from the plasma 5 kg of sodium chloride are added, then after the dissolution of the salt the mixture is filled into an airtight van and closed then kept for thirty minutes at a temperature of 90° C. 110 kg of a solid product storable without cooling for weeks and containing 30% of protein are obtained which is an excellent fodder.

EXAMPLE 3

To 100 l of a blood fraction separated from the plasma 10 l of yeast milk and 2 kg of sodium chloride are added. The mixture is filled into an airtight vessel and kept at a temperature of 90° C. for 30 minutes. The product is biologically very valuable and is put into circulation as fodder enriched by B vitamins.

EXAMPLE 4

To 100 l of animal blood 2 kg of sodium chloride, 100 g of iron(II)-sulfate, 10 g of manganese-(II)chloride, 5 g of zinc sulfate, 100 g of potassium chloride and 10 g of copper sulfate are added. After the dissolution of the salt the mixture is sterilized in an airtight vessel by heat-treatment. The sterilized product is used as fodder enriched by trace elements.

EXAMPLE 5

To 100 kg of a blood fraction separated from the plasma 20 kg of ground slaughter-house waste products, 5 kg of sodium chloride are added and the mixture is kept in an airtight vessel at a temperature of 120° C. for 2 hours. A fodder of a high biological value storable without cooling for months is obtained.

EXAMPLE 6

To 100 l of blood plasma 1 kg of ferrosulfate containing seven moles of water, 20 g of 1-ascorbic-acid are added and the solution is admixed at room temperature of twenty minutes. The color of the solution changes to green-brown. Then the mixture is heated to 85° C. for 5 minutes. The solid phase is separated from the liquid, dried under oxygen-free conditions and pulverized, 8 kg of a protein concentrate are obtained which contains the iron in a form utilizable for the organism and is suitable for the preparation of special nutriments.

EXAMPLE 7

To 100 l of animal blood a solution of 5 g of nebramycine prepared with 1 l of water and 5 kg of wheat bran are added. The mixture is kept in an airtight vessel at a temperature of 90° C. for one hour after admixing. A nutriment of a wide antibacterial effect is obtained which contains the antibiotic in stabilized homogeneous distribution.

EXAMPLE 8

To 100 l of a blood fraction separated from the plasma 20 kg of ground green tomato are added and the mixture is filled into plastic sacks and closed airtightly sterilized at a temperature of 120° C. A storable, easily transportable solid preboiled product is obtained.

EXAMPLE 9

To 100 l of a blood fraction separated from the plasma 2 kg of activated carbon are added and the mixture is thoroughly admixed. Then the mixture is heated to a temperature of 80° C. for five minutes so that the suspension becomes solid. The protein concentrate containing the carbon in a stabilized homogeneous distribution can be administered as nutriment to animals suffering from diarrhoea.

EXAMPLE 10

To 100 l of blood plasma 1.5 kg of aminoacetic acid sodium are added. After the dissolution of the amino acid salt the mixture is heated under slow admixing to a temperature of 80° C. for five minutes. The precipitated plasma protein is separated from the liquid phase by centrifuging, dried at 40° C. in vacuo and pulverized, 7 kg of hydrophilic protein are obtained.

EXAMPLE 11

One proceeds as described in Example 10 with the difference that the sodium salt of lactic acid is used instead of the amino acetic acid.

What we claim is:

1. A process for the preparation of a concentrated protein nutriment from animal blood which comprises the steps of:
   (a) dissolving in animal blood or in a blood fraction thereof 1 to 6% by weight of a sodium salt selected from the group which consists of sodium chloride, sodium hydrogen carbonate, and sodium carbonate;
   (b) also dissolving in the animal blood or in the blood fraction thereof the following additives:
      1 to 6% by weight of a pharmaceutically acceptable iron (II) salt;
      up to 3% of an organic acid or an alkali metal salt thereof;
      up to 1% of a trace element;
      up to 1% of an antibiotic or vitamin; and
      activated carbon in an amount of 5 to 10% by weight;
      to form a mixture;
   (c) heat-treating the mixture formed during steps (a) and (b) at a temperature between 70° and 140° C. to obtain a solid product which includes precipitated proteins contained in the animal blood or blood fraction thereof; and (d) drying the precipitated proteins.

2. The process defined in claim 1 wherein in step (a) the blood fraction is blood plasma.

3. The process defined in claim 1 wherein in step (b) the additive is a B vitamin.

4. The process defined in claim 1 wherein in step (b), the additives include iron (II) sulfate, and manganese (II) chloride, zinc sulfate, potassium chloride and copper sulfate, as sources for the trace element.

5. The process defined in claim 1 wherein the plant or animal waste is ground slaughter house waste.

6. The process defined in claim 1 wherein the vitamin is Vitamin C.

7. The process defined in claim 1 wherein the iron (II) salt is iron sulfate.

8. The process defined in claim 1 wherein the organic acid is an amino acid.

9. A method for supplementing the diet of an animal subject which comprises the step of administering to said animal an effective amount of the concentrated protein nutrient defined in claim 1.

10. A process for the preparation of both a hydrophilic plasma powder suitable in the preparation of food as well as a concentrated protein nutriment suitable for administration to an animal lacking iron, which comprises the steps of:

(a) separating 200 liters of ox blood under sterile conditions into two blood fractions, one 90 liter fraction comprising plasma and the other 110 liter fraction comprising hemoglobin;

(b) treating the blood plasma fraction with 2.5 kg of sodium hydrogen carbonate and heating the mixture to 80° C. after dissolving of the sodium hydrogen carbonate under slow admixing for 5 minutes to precipitate plasma proteins;

(c) separating the precipitated plasma proteins from the liquid phase by centrifuging and drying the precipitated plasma proteins in vacuo at a temperature of 40° C.;

(d) pulverizing the precipitated plasma proteins to obtain a hydrophilic plasma powder suitable for the preparation of food;

(e) treating the 90 liter fraction comprising hemoglobin with 5 kg of a ferrosulfate in 10 liters of water and thoroughly admixing same; and (f) heating the mixture in an air-tight vessel for 5 minutes at 80° C., then for 60 minutes at 100° C. to obtain a blood precipitate containing the iron in a stabilized homogeneous distribution.

* * * * *